United States Patent
Vivanco et al.

(10) Patent No.: US 9,648,529 B1
(45) Date of Patent: May 9, 2017

(54) SYSTEMS AND METHODS FOR AVOIDING PACKET LOSS DURING A HANDOVER

(71) Applicant: Sprint Spectrum LP, Overland Park, KS (US)

(72) Inventors: Daniel Vivanco, Sterling, VA (US); Diego Estrella Chavez, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 168 days.

(21) Appl. No.: 14/577,067

(22) Filed: Dec. 19, 2014

(51) Int. Cl.
*H04W 36/02* (2009.01)
*H04W 40/36* (2009.01)
*H04W 88/12* (2009.01)

(52) U.S. Cl.
CPC ......... *H04W 36/023* (2013.01); *H04W 40/36* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 8,755,800 B2 | 6/2014 | Yoon et al. | |
| 2005/0083885 A1* | 4/2005 | Ikeda | H04L 29/12009 370/331 |
| 2010/0046476 A1* | 2/2010 | Qiu | H04W 36/02 370/331 |
| 2010/0177739 A1* | 7/2010 | Huang | H04W 36/02 370/331 |
| 2011/0116478 A1 | 5/2011 | Zhang et al. | |
| 2011/0158201 A1* | 6/2011 | Yokota | H04W 36/02 370/331 |
| 2012/0099561 A1* | 4/2012 | Zhao | H04W 36/023 370/331 |
| 2013/0100929 A1* | 4/2013 | Liu | H04W 36/00 370/331 |

* cited by examiner

*Primary Examiner* — Gary Mui (57) ABSTRACT

Systems and methods are described for avoiding packet loss during a handover. A handover request may be received at a control element of a first communication network. It may be determined that the handover request comprises a first type of handover request. A gateway node of the first communication network may be instructed to buffer packets for the wireless device based on the determination that the handover request comprises a first type of handover request. And the gateway node may be instructed to stop buffering the packets for the wireless device based on an execution of the requested handover.

18 Claims, 6 Drawing Sheets

SYSTEMS AND METHODS FOR AVOIDING PACKET LOSS DURING A HANDOVER

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, the network access point used by a wireless device for access to the network may be changed. For example, a handover may be performed such that a wireless device changes from communicating with a first access node to communicating with a second access node. A system that effectively provides network services when such changes are performed may be able to provide a high quality service to users of the system.

Overview

Systems and methods are described for avoiding packet loss during a handover. A handover request may be received at a control element of a first communication network. It may be determined that the handover request comprises a first type of handover request. A gateway node of the first communication network may be instructed to buffer packets for the wireless device based on the determination that the handover request comprises a first type of handover request. And the gateway node may be instructed to stop buffering the packets for the wireless device based on an execution of the requested handover.

DETAILED DESCRIPTION

Figure 1:
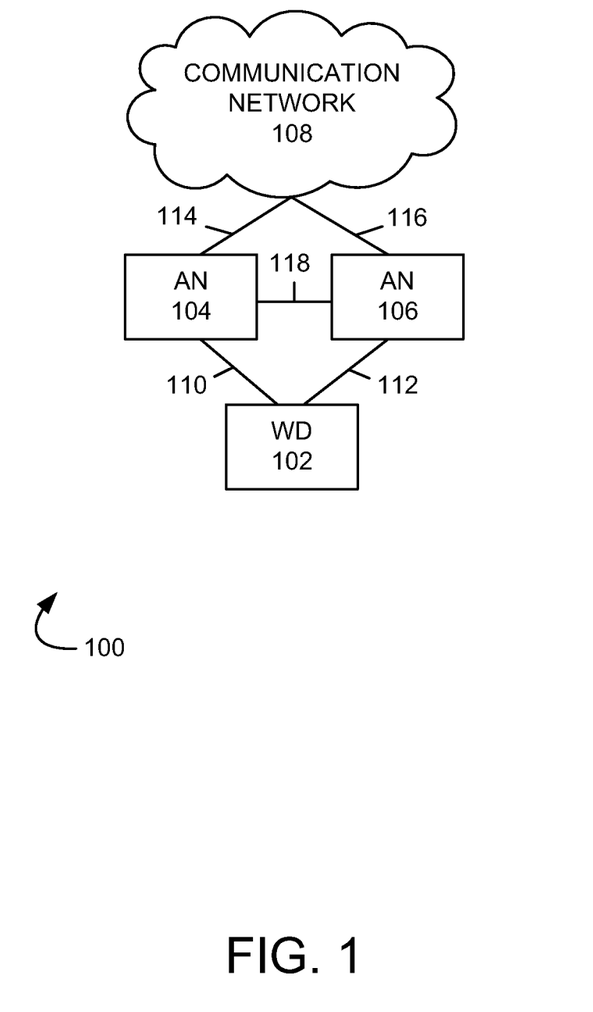
FIG. 1 illustrates an exemplary communication system to avoid packet loss during a handover.

FIG. 1 illustrates an exemplary communication system 100 to avoid packet loss during a handover comprising wireless devices 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104 and 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 114 and 116 respectively. Access nodes 104 and 106 may also communicate directly with each other over communication link 118.

Although only access nodes 104 and 106 are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
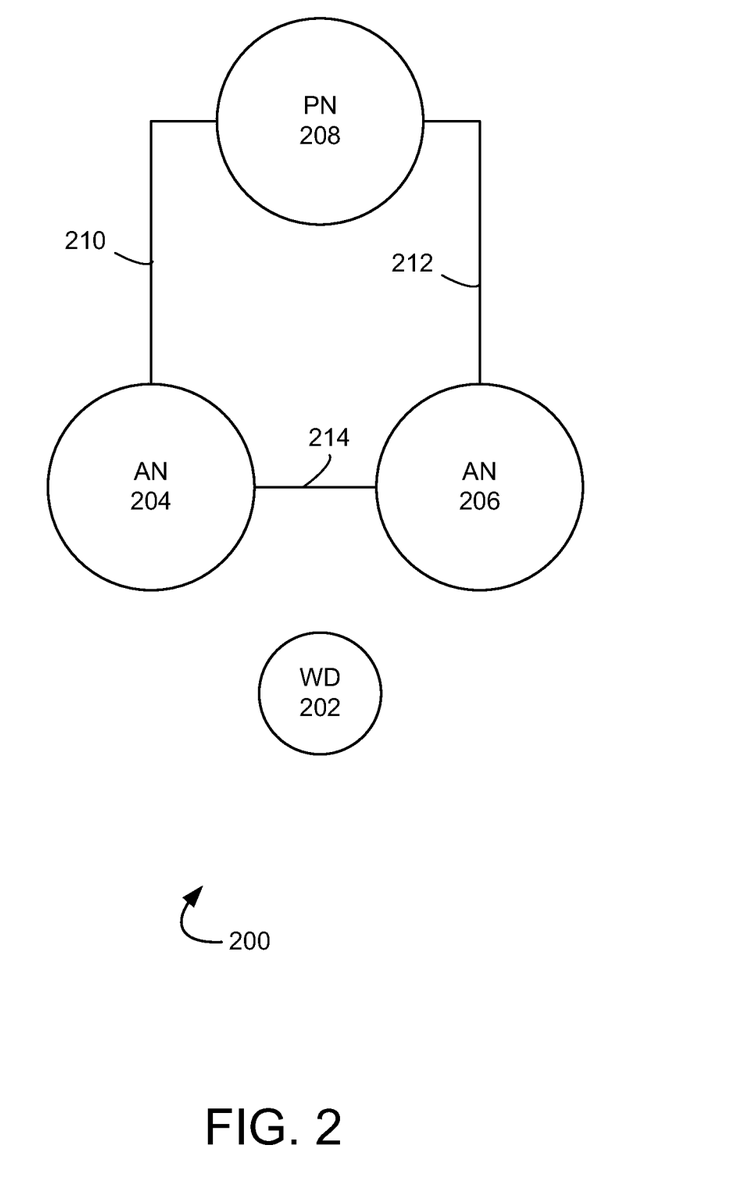
FIG. 2 illustrates another exemplary system to avoid packet loss during a handover.

FIG. 2 illustrates an exemplary communication system 200 for avoiding packet loss during a handover. System 200 comprises wireless device 202, access nodes 204 and 206, processing node 208, and communication links 210, 212, and 214. Wireless device 202 may comprise a wireless device similar to wireless device 102 of FIG. 1. Access nodes 204 and 206 may comprise access nodes similar to access node 104 of FIG. 1. Processing node 208 may comprise an access node, controller node, or any other processing node as described herein. Communication links 210, 212, and 214 may comprise communication links similar to communication links illustrated in FIG. 1.

In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 204 may establish communication with a wireless device 202 such that access node 204 provides the wireless device access to a communication network (such as communication network 108, illustrated in FIG. 1). Access node 204 may communicate with access node 206 and processing node 208. For example, access node 204 may share load information with access node 206 in order to perform load balancing or may communicate with access node 206 in order to perform a handover of a wireless device. In addition, processing node 208 may comprise a controller node, and access node 204 may communicate with processing node 208 in order to update configuration information at the access node (e.g., a neighbor relations table, tracking area information, and the like).

In an embodiment, communication link 214 may comprise an X2 communication link between access nodes. Accordingly, messages may be transmitted between access node 204 and access node 206 over the X2 communication link. In addition, communication links 210 and 212 may comprise S1 links between an access node and a processing node (e.g., controller node, gateway node, and the like). Accordingly, messages may be transmitted between access node 204 and processing node 208 over the S1 communication link (e.g., communication link 210) and messages may be transmitted between access node 206 and processing node 208 over the S1 communication link (e.g., communication link 212).

In an embodiment, multiple types of handovers may be performed in a wireless communication system. A handover may comprise a process (e.g., series of steps) used to switch a wireless device from communicating with first access node to communicating with a second access node (e.g., switching the servicing access node for a wireless device from the first access node to the second access node). For example, access node 204 may perform a handover to access node 206 such that wireless device 202 switches from communicating with access node 204 to communicating with access node 206. During such a handover packets for the wireless device may be communicated between the access nodes using a tunnel.

In an embodiment, the tunnel may be direct between access nodes 204 and 206 (e.g., using the X2 communication link 214) or the tunnel may be established using the S1 communication links 210 and 212 and processing node 208. An exemplary type of handover using processing node 208 includes communicating with the processing node in order to establish the tunnel. In certain configurations, processing node 208 may not support tunnel creation for this exemplary type of handover, and packet loss can result from the incompatibility. For example, when processing node 208 does not support creation of such a tunnel for the exemplary type of handover, the tunnel that communicates packets from access node 204 to access node 206 may not be established. Accordingly, a system that considers handover type compatibility may enhance user experience by avoiding packet loss during a handover.

Systems and methods are described for avoiding packet loss during a handover. A handover request may be received at a control element of a first communication network. It may be determined that the handover request comprises a first type of handover request. A gateway node of the first communication network may be instructed to buffer packets for the wireless device based on the determination that the handover request comprises a first type of handover request. And the gateway node may be instructed to stop buffering the packets for the wireless device based on an execution of the requested handover.

Figure 3:
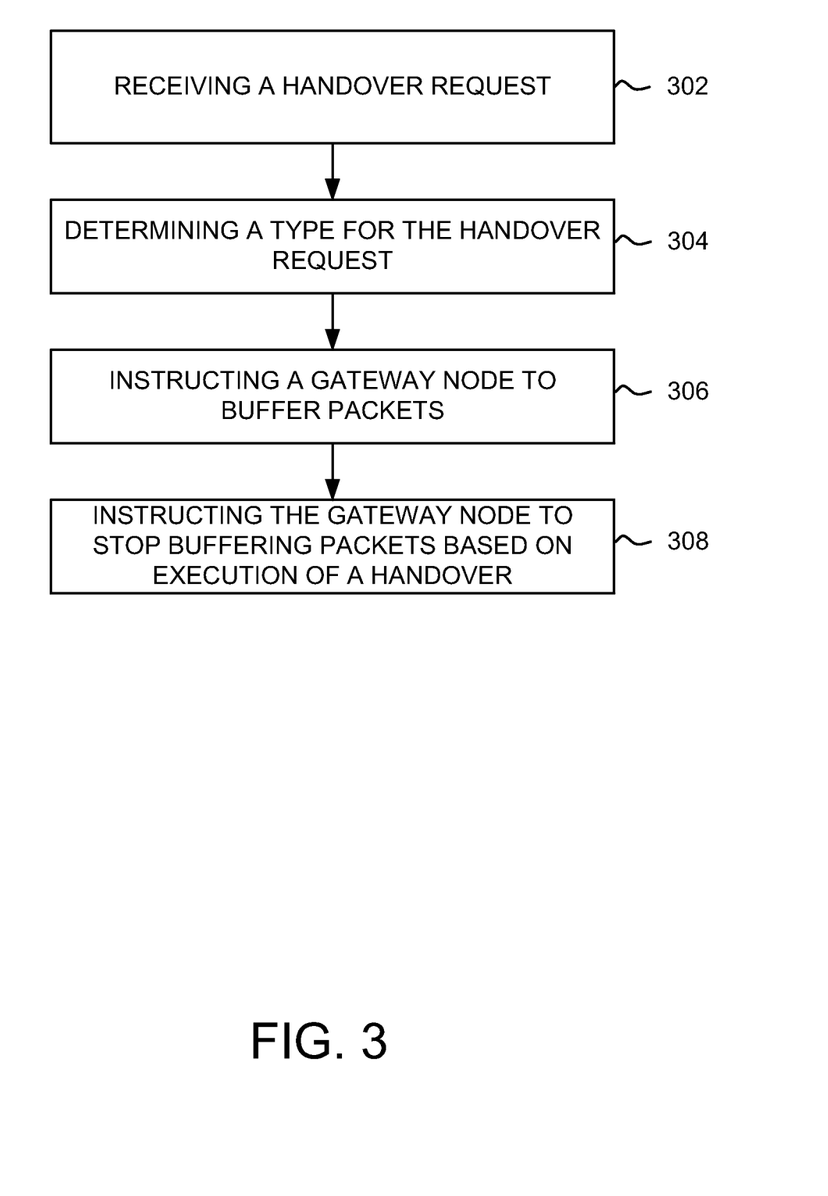
FIG. 3 illustrates an exemplary method of avoiding packet loss during a handover.

FIG. 3 illustrates an exemplary method for avoiding packet loss during a handover. The method will be discussed with reference to the exemplary communication system 200 illustrated in FIG. 2, however, the method can be implemented with any suitable communication system.

Referring to FIG. 3, at step 302, a handover request may be received at a processing node. For example, a handover request may be received at processing node 208, where in the handover request is associated with wireless device 202 in communication with access node 204. The handover request may comprise a request to handover wireless device 202 from access node 204 to access node 206.

At step 304, it may be determined that the handover request comprises a first type of handover request. For example, it may be determined that the handover request comprises a first type of handover request that uses processing node 208 to establish a tunnel used for communication between access node 204 and access node 206. In an embodiment, the tunnel may be used to communicate packets for wireless device 202 between access node 204 and access node 206 while processing the first type of handover request.

At step 306, a gateway node may be instructed to buffer packets for the wireless device based on the determination that the handover request comprises a first type of handover request. In an embodiment, a gateway node (not depicted) may connect system 200 to a network (e.g., the Internet). In this example, the gateway node may receive and route packets for wireless device 202 through system 200. For instance, wireless device 202 may be in communication with a network attached device (e.g., a server) over the Internet, and the gateway node may receive and route packets transmitted from the network attached storage device to wireless device 202. A gateway node may comprise one of a serving gateway (SGW), a packet data network gateway (PDNGW), a cellular gateway (CGW), a combination thereof, and any other suitable gateway node. In an embodiment, the gateway node may be instructed to buffer packets for wireless device 202 at the gateway node (e.g., to delay sending the packets to the wireless device) based on the determination that the handover request comprises a first type of handover request.

At step 308, the gateway node may be instructed to stop buffering packets for the wireless device based on an execution of the requested handover. For example, the gateway node may be instructed to stop buffering packets for wireless device 202 based on an execution of the requested handover. An execution of the requested handover may comprise executing a handover of wireless device 202 from access node 204 to access node 206. When the packets for wireless device 202 are released from the buffer, the packets may be routed to access node 206 such that access node 206 may transmit the packets to wireless device 202 (e.g., using one or more physical resource block wireless transmissions).

Figure 4:
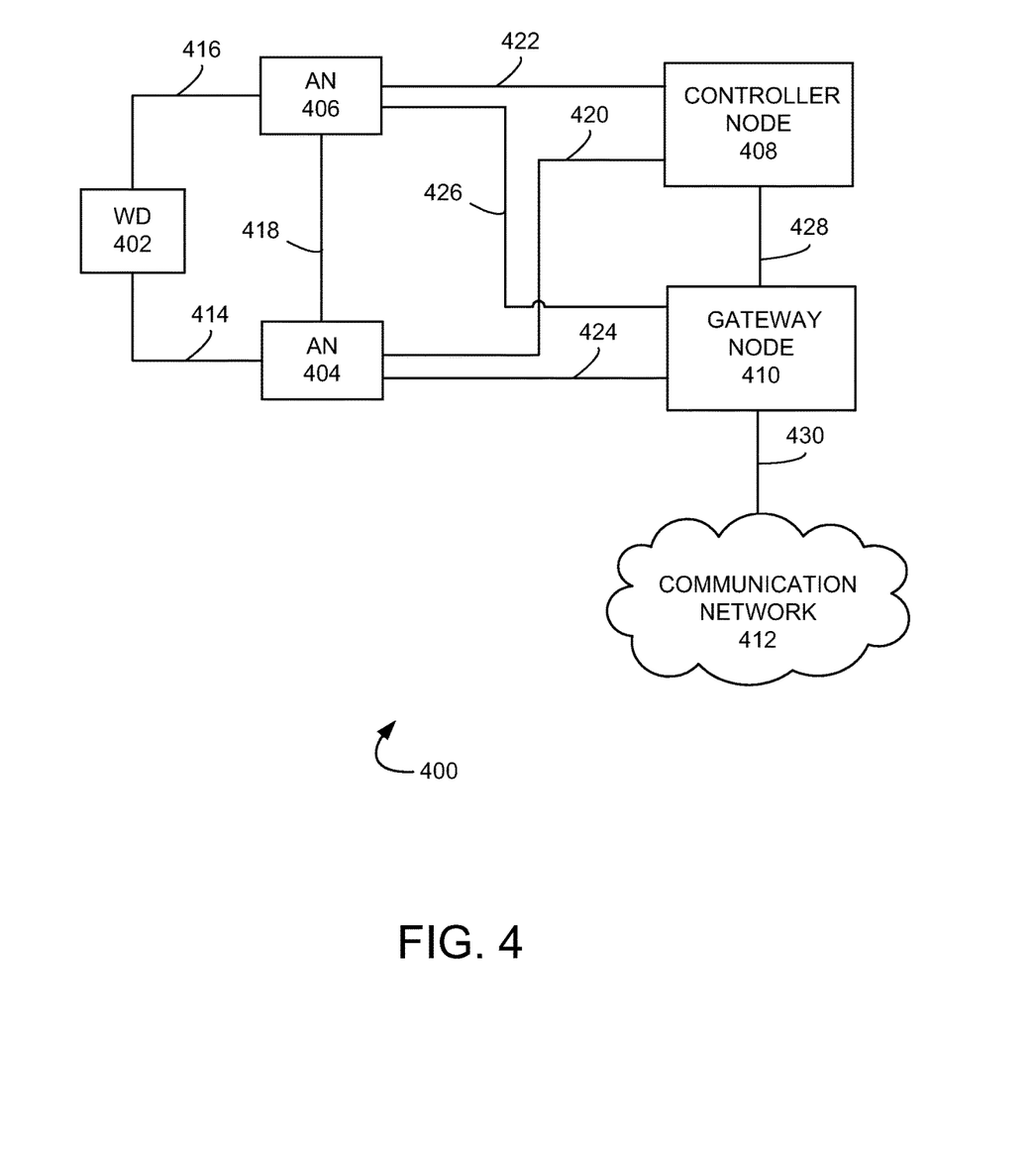
FIG. 4 illustrates another exemplary system to avoid packet loss during a handover.

FIG. 4 illustrates another exemplary communication system 400 to avoid packet loss during a handover. Communication system 400 may comprise wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, or an eNodeB device. In an embodiment, access node 404 can comprise a serving access node for wireless device 402. Access nodes 404 and 406 may communicate with controller node 408 over communication links 420 and 422, respectively, and with gateway node 410 over communication links 424 and 426, respectively. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430, 432 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access nodes 404 and/or 406 may perform all or parts of the methods of FIGS. 3 and 5.

In an embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 404 may establish communication with wireless devices 402 such that access node 404 provides the wireless devices access to a communication network (e.g., communication network 412). Access node 404 may communicate with access node 406 and controller node 408. For example, access node 404 may share load information with access node 406 in order to perform load balancing or may communicate with access node 406 in order to perform a handover of a wireless device. In addition, access node 404 may communicate with controller node 408 in order to update configuration information at the access node (e.g., a neighbor relations table, tracking area information, and the like).

In an embodiment, communication link 418 may comprise an X2 communication link between access nodes. Accordingly, messages may be transmitted between access node 404 and access node 406 over the X2 communication link. In addition, communication links 420 and 422 may comprise S1 links between an access node and a processing node (e.g., controller node 408, gateway node 410, and the like). Accordingly, messages may be transmitted between access node 404 and controller node 408 over the S1 communication link (e.g., communication link 420) and messages may be transmitted between access node 406 and processing node 408 over the S1 communication link (e.g., communication link 422).

In an embodiment, multiple types of handovers may be performed in a wireless communication system. A handover may comprise a process (e.g., series of steps) used to switch a wireless device from communicating with first access node to communicating with a second access node (e.g., switching the servicing access node for a wireless device from the first access node to the second access node). For example, access node 404 may perform a handover to access node 406 such that wireless device 402 switches from communicating with access node 404 to communicating with access node 406. During such a handover packets for the wireless device may be communicated between the access nodes using a tunnel.

In an embodiment, the tunnel may be direct between access nodes 404 and 406 (e.g., using the X2 communication link 418) or the tunnel may be established using the S1 communication links 420,422,424,426 and 428 and controller node 408 and gateway node 410. An exemplary type of handover using controller node 408 includes communicating with the processing node in order to establish the tunnel. In certain configurations, controller node 408 may not support tunnel creation for this exemplary type of handover, and packet loss can result from the incompatibility. For example, when controller node 408 does not support creation of such a tunnel for the exemplary type of handover, the tunnel that communicates packets from access node 404 to access node 406 may not be established. Accordingly, a system that considers handover type compatibility may enhance user experience by avoiding packet loss during a handover.

Systems and methods are described for avoiding packet loss during a handover. A handover request may be received at a control element of a first communication network. It may be determined that the handover request comprises a first type of handover request. A gateway node of the first communication network may be instructed to buffer packets for the wireless device based on the determination that the handover request comprises a first type of handover request.

And the gateway node may be instructed to stop buffering the packets for the wireless device based on an execution of the requested handover.

Figure 5:
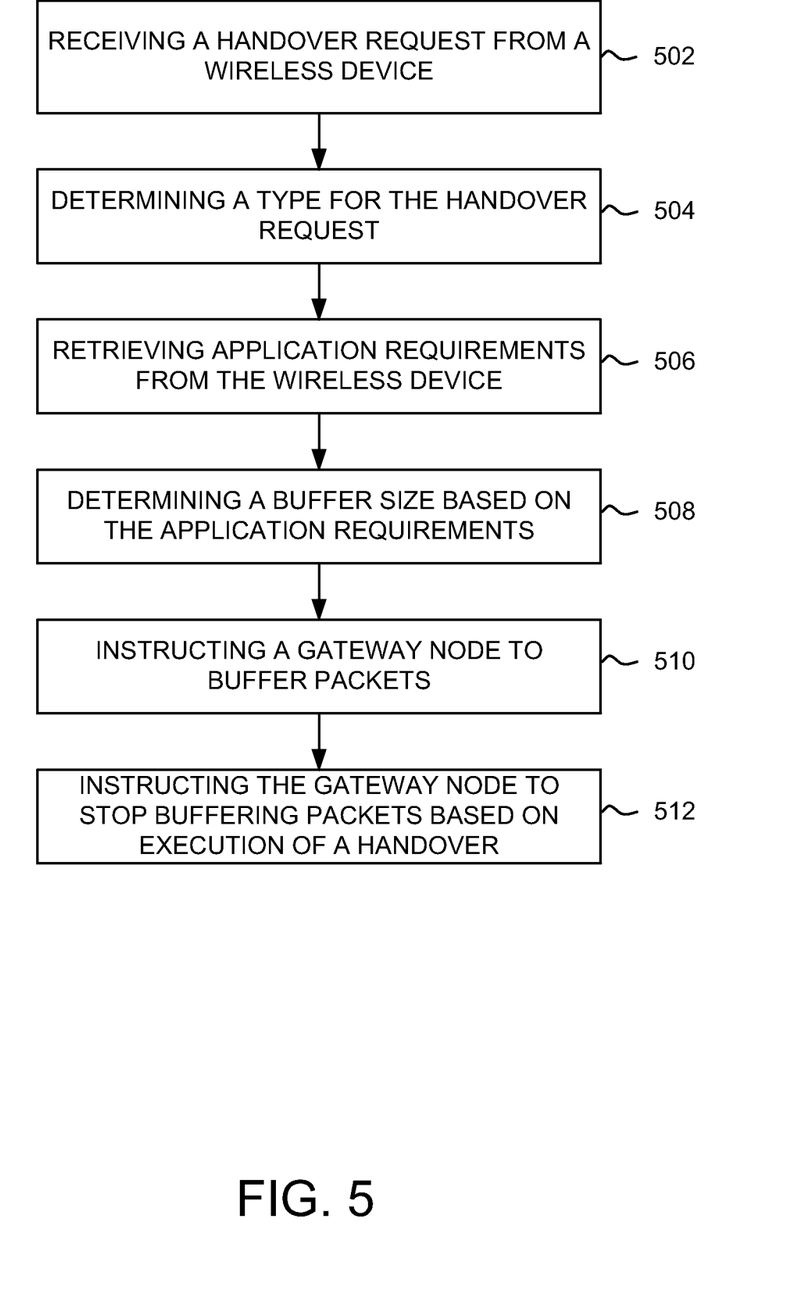
FIG. 5 illustrates another exemplary method of avoiding packet loss during a handover.

FIG. 5 illustrates an exemplary method for avoid packet loss during a handover. The method will be discussed with reference to the exemplary communication system 400 illustrated in FIG. 4, however, the method can be implemented with any suitable communication system.

Referring to FIG. 5, at step 502, a handover request may be received at a processing node. For example, a handover request may be received at processing node 408, wherein the handover request is associated with wireless device 402 in communication with access node 404.

In an embodiment, based on signal data (e.g., measurement reports) from wireless device 402, it may be determined that the wireless device will be handed over from access node 404 to access node 406. Accordingly, the handover request may comprise a request to handover wireless device 402 from access node 404 to access node 406, and the request may originate from one of wireless device 402, access node 404, or any other suitable element of system 400.

At step 504, it may be determined that the handover request comprises a first type of handover request. For example, it may be determined that the handover request comprises a first type of handover request that uses controller node 408 to establish a tunnel used for communication between access node 404 and access node 406. In an embodiment, the tunnel may be used to communicate packets for wireless device 402 between access node 404 and access node 406 while processing the first type of handover request.

At step 506, application requirements may be retrieved for the wireless device. For example, application requirements may be retrieved for wireless device 402. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, wireless device 402 may comprise one or more quality of service class identifiers (QCI) when in communication with access node 404, and the one or more QCIs may be retrieved.

In another embodiment, application requirements for wireless device 402 may retrieved based on packet inspection at access node 404 or gateway node 410. For example, access node 404 or gateway node 410 may perform packet inspection (e.g., deep packet inspection (DPI)) on packets received at the access node, including packets associated with wireless device 402 (e.g., transmitted from the wireless device or transmitted to the wireless device). In an embodiment, access node 404 or gateway node 410 may inspect downstream packets (e.g., packets for wireless device 402) or upstream packets (e.g., packets from wireless device 402) in order to determine applications that are associated with wireless device 402 (e.g., running on wireless device 402). Based on the applications, application requirements may be determined for wireless device 402. Any other suitable method may be used to determine application requirements for wireless device 402 may be implemented.

At step 508, a buffer size may be determined based on the application requirements. For example, a buffer size for a packet buffer at gateway node 410, as described herein, may be determined. The buffer size may be based on the application requirements retrieved for wireless device 402.

In an embodiment, a retrieved application requirement for wireless device 402 may comprise a data rate, and the buffer size may be directly proportional to the data rate. For example, the application requirement may comprise a QCI with an associated data rate, and the buffer size may increase in proportion with the data rate associated with the QCI. In another embodiment, the buffer size may be based on an application associated with the retrieved application requirements. For example, the application requirement may comprise a QCI associated with a voice over IP (VoIP) application, and the buffer size may be determined based on the VoIP application. In another example, packet inspection may be used to determine that a voice over IP (VoIP) application on wireless device 402 is communicating with access node 404, and the buffer size may be determined based on the VoIP application.

At step 510, a gateway node may be instructed to buffer packets for the wireless device based on the determination that the handover request comprises a first type of handover request. In an embodiment, gateway node 410 may connect system 400 to a network (e.g., the Internet). In this example, the gateway node may receive and route packets for wireless device 402 through system 400. For instance, wireless device 402 may be in communication with a network attached device (e.g., a server) over the Internet, and gateway node 410 may receive and route packets transmitted from the network attached storage device to wireless device 402. A gateway node may comprise one of a serving gateway (SGW), a packet data network gateway (PDNGW), a cellular gateway (CGW), a combination thereof, and any other suitable gateway node. In an embodiment, gateway node 410 may be instructed to buffer packets for wireless device 402 at the gateway node (e.g., to delay sending the packets to the wireless device) based on the determination that the handover request comprises a first type of handover request.

In an embodiment, the first type of handover request may comprise a handover request that uses controller node 408 to establish a tunnel used for communication between access node 404 and access node 406 (e.g., communication during execution of the handover). For example, controller node 408 may not be compatible with the first type of handover. Here, controller node 408 may not support the establishment of a tunnel (e.g., using S1 communication links) between access node 404 and access node 406. Based on the incompatibility, gateway node 410 may be instructed to buffer packets. In an embodiment, buffering the packets at gateway node 410 may avoid packet loss associated with execution of the requested first type of handover.

In an embodiment, gateway node 410 may be instructed to buffer packets for the wireless device based on the determination that the handover request comprises a first type of handover request and based on whether the handover is an inter-access point or intra-access point handover. For example, certain handovers take place at a single access node (e.g., intra-access point) while others handover a wireless device from a first access node to a second access node (e.g., inter-access point). In an embodiment, an inter-access point handover may indicate an incompatibility with the first type of handover request. Accordingly, in an embodiment, gateway node 410 may be instructed to buffer packets for the wireless device based on the determination that the handover request comprises a first type of handover request and comprises an inter-access point handover request.

In an embodiment, gateway node 410 may be instructed to buffer packets for the wireless device based on the determination that the handover request comprises a first type of handover request and based on the one or more retrieved application requirements. For example, the one or more retrieved application requirements may be compared to an application requirement criteria, and gateway node 410 may be instructed to buffer packets for wireless device 402 when the retrieved application requirements meet the application requirement criteria.

In an embodiment, the retrieved application requirements for wireless device 402 may comprise one or more QCIs. The application requirement criteria may comprise a subset of QCIs, such as QCIs that comprise guaranteed bit rates, guaranteed bit rates above a threshold, and the like (e.g., one or more of QCIs 2, 3, 4, and 5). In another example, the application requirement may comprise a subset of QCIs that may be used to provide voice service to a wireless device. Accordingly, it may be determined whether the retrieved QCIs meet an application requirement criteria (e.g., a QCI with a guaranteed bit rate greater than a threshold, a QCI that may be used to provide voice services to a wireless device, and the like).

In an embodiment, the retrieved application requirements for wireless device 402 may comprise one or more data rates. The application requirement criteria may comprise a threshold data (e.g., minimum data rate). Accordingly, it may be determined whether the retrieved application requirements meet an application requirement criteria (e.g., are greater than or equal to the threshold data rate).

In another embodiment, the retrieved application requirements may be associated with one or more applications on wireless device 402. The application requirement criteria may comprise a subset of applications, such as VOIP applications, video streaming applications, other applications that use a data rate above a threshold, and the like. Accordingly, it may be determined whether the applications associated with the one or more application requirements meet an application requirement criteria (e.g., subset of applications). Gateway node 410 may be instructed to buffer packets for wireless device 402 when the applications associated with the retrieved application requirements meet the application requirement criteria.

In an embodiment, the determination to buffer packets at gateway node 410 may be based on a utilization of the one or more S1 links that communicatively connect access node 404 to the gateway node and access node 406 to the gateway node. For example, a utilization of communication links 424 and 426 may be determined, and the determined utilization may be compared to a utilization criteria. For example, the determined utilization may comprise a data rate for the communication link, volume of traffic, percentage of peak utilization, and the like. When the determined utilization meets a utilization criteria (e.g., threshold percentage of peak utilization), gateway node 410 may be instructed to buffer packets. In an embodiment, gateway node 410 may be instructed to buffer packets for wireless device 402 when retrieved application requirements meet an application requirement criteria and the determined utilization of the S1 communication links meets a utilization criteria.

At step 512, the gateway node may be instructed to stop buffering packets for the wireless device based on an execution of the requested handover. For example, the gateway node may be instructed to stop buffering packets for wireless device 402 based on an execution of the requested handover. An execution of the requested handover may comprise executing a handover of wireless device 402 from access node 404 to access node 406. When the packets for wireless device 402 are released from the buffer, the packets may be routed to access node 406 such that access node 406 may transmit the packets to wireless device 402 (e.g., using one or more physical resource block wireless transmissions).

In an embodiment, step 510 (e.g., the instruction to start buffering) may be transmitted to gateway node 410 by controller node 408. For example, during execution of a requested handover, when a handover command message is transmitted from controller node 408 to access node 404 (and eventually to wireless device 402 from access node 404), the controller node 408 may also transmit the instruction to start buffering.

In an embodiment, step 512 (e.g., the instruction to stop buffering) may be transmitted to gateway node 410 by controller node 408. For example, during execution of a requested handover, when controller node 408 receives a response (e.g., acknowledgment message) that data bearers have been established for wireless device 402 (e.g., data bearers based on the application requirements for wireless device 402), the controller node 408 may transmit the instruction to stop buffering.

In an embodiment, access node 404 may be associated with a first controller node while access node 406 may be associated with a second controller node. Here, during handover of a wireless device from access node 404 to access node 406, the first controller node may comprise a source controller node while the second controller node may comprise a target controller node. In an embodiment, the instruction to start buffering may be transmitted by the source controller node to the gateway node, while the instruction to stop buffering may be transmitted by the target controller node to the gateway node. In another embodiment, access node 404 and access node 406 may be associated with the same controller node, and this controller node may perform the functions of the source controller node and target controller node described herein (e.g., transmitting instructions to start/stop buffering to the gateway node).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
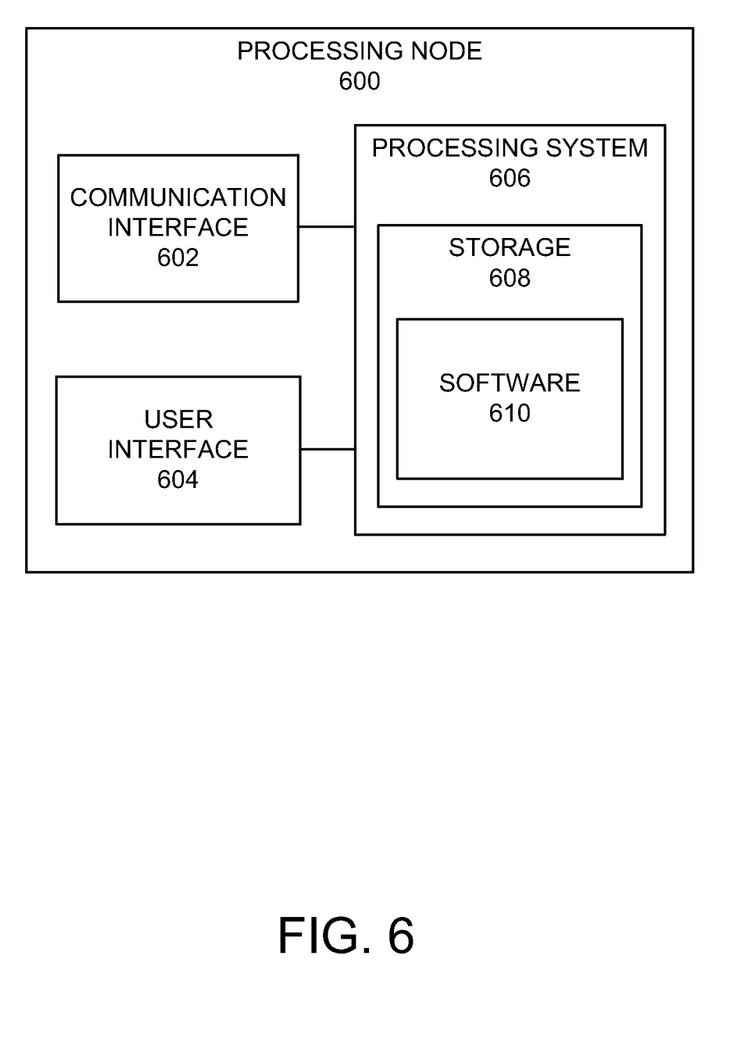
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104 or 404 and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for avoiding packet loss during a handover, the method comprising:
   receiving, at a controller node of a first communication network, a handover request associated with a wireless device in communication with a first access node;
   determining that the handover request comprises a first type of handover request, wherein the first type of handover request is incompatible with the controller node;
   instructing a gateway node of the first communication network to buffer packets for the wireless device based on the incompatibility between the first type of handover request and the controller node; and instructing the gateway node to stop buffering the packets for the wireless device based on an execution of the handover of the wireless device.

2. The method of claim 1, wherein
the first type of handover request comprises a request to establish a tunnel between the first access node and a target access node using the controller node and the gateway node, and
the controller node is incompatible with the requested tunnel.

3. The method of claim 1, further comprising:
retrieving one or more application requirements of the wireless device proximate to the received handover request; and
instructing the gateway node of the first communication network to buffer packets for the wireless device based on the determination that the handover request comprises a first type of handover request and the one or more retrieved application requirements.

4. The method of claim 3, wherein the gateway node is instructed to buffer packets for the wireless device when the one or more retrieved application requirements meet an application requirement criteria.

5. The method of claim 4, wherein the one or more retrieved application requirements comprise a data rate and the application requirement criteria comprises a threshold data rate, such that the one or more retrieved application requirements meet the application requirement criteria when the data rate for the one or more retrieved application requirements is greater than or equal to the threshold data rate.

6. The method of claim 4, further comprising:
determining a buffer size for the packets for the wireless device based on the retrieved applications requirements.

7. The method of claim 6, wherein the one or more retrieved application requirements comprise a data rate and the buffer size is directly proportional to the data rate of the one or more retrieved application requirements.

8. The method of claim 1, wherein instructing the gateway node to stop buffering the packets for the wireless device based on an execution of the requested handover further comprises instructing the gateway node to stop buffering the packets when a data bearer is established between the wireless device and a target access node that corresponds to one or more application requirements of the wireless device.

9. The method of claim 1, wherein
the first type of handover comprises an inter-access node handover, and
the gateway node is instructed to buffer packets for the wireless devices based on the requested handover being an inter-access node handover.

10. A system for avoiding packet loss during a handover, the system comprising:
a source controller node comprising a processor, wherein the source controller node is configured to:
receive a handover request associated with a wireless device in communication with a first access node;
determine that the handover request comprises a first type of handover request wherein the first type of handover request is incompatible with the controller node;
instruct a gateway node of the first communication network to buffer packets for the wireless device the incompatibility between the first type of handover request and the controller node; and
a target controller node that comprises a target for the requested handover, wherein the target controller node is configured to:
instruct the gateway node to stop buffering the packets for the wireless device based on an execution of the handover of the wireless device.

11. The system of claim 10, wherein
the first type of handover request comprises a request to establish a tunnel between the first access node and a target access node using the source controller node and the gateway node, and
the source controller node is incompatible with the requested tunnel.

12. The system of claim 10, wherein the source controller node is further configured to:
retrieve one or more application requirements of the wireless device proximate to the received handover request; and
instruct the gateway node of the first communication network to buffer packets for the wireless device based on the determination that the handover request comprises a first type of handover request and the one or more retrieved application requirements.

13. The system of claim 12, wherein the gateway node is instructed to buffer packets for the wireless device when the one or more retrieved application requirements meet an application requirement criteria.

14. The system of claim 13, wherein the one or more retrieved application requirements comprise a data rate and the application requirement criteria comprises a threshold data rate, such that the one or more retrieved application requirements meet the application requirement criteria when the data rate for the one or more retrieved application requirements is greater than or equal to the threshold data rate.

15. The system of claim 13, wherein the source controller node is further configured to:
determine a buffer size for the packets for the wireless device based on the retrieved applications requirements.

16. The system of claim 15, wherein the one or more retrieved application requirements comprise a data rate and the buffer size is directly proportional to the data rate of the one or more retrieved application requirements.

17. The system of claim 10, wherein instructing the gateway node to stop buffering the packets for the wireless device based on an execution of the requested handover further comprises instructing the gateway node to stop buffering the packets when a data bearer is established between the wireless device and a target access node that corresponds to one or more application requirements of the wireless device.

18. The system of claim 10, wherein
the first type of handover comprises an inter-access node handover, and
the gateway node is instructed to buffer packets for the wireless devices based on the requested handover being an inter-access node handover.

* * * * *